(12) United States Patent
Gao et al.

(10) Patent No.: US 10,661,368 B2
(45) Date of Patent: May 26, 2020

(54) METHOD AND APPARATUS FOR MACHINING WORKPIECE

(71) Applicant: GENERAL ELECTRIC COMPANY, Schenectady, NY (US)

(72) Inventors: Qing Gao, Shanghai (CN); Renwei Yuan, Shanghai (CN); Howard Paul Weaver, Evendale, OH (US); Richard Leigh Adrian, Evendale, OH (US); Xiaobin Chen, Shanghai (CN)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 15/470,016

(22) Filed: Mar. 27, 2017

(65) Prior Publication Data

US 2017/0282267 A1    Oct. 5, 2017

(30) Foreign Application Priority Data

Mar. 30, 2016    (CN) .......................... 2016 1 0191987

(51) Int. Cl.
*B23H 1/04*    (2006.01)
*B23H 9/10*    (2006.01)
(Continued)

(52) U.S. Cl.
CPC ................. *B23H 1/04* (2013.01); *B23H 9/10* (2013.01); *F01D 5/34* (2013.01); *F01D 9/04* (2013.01);
(Continued)

(58) Field of Classification Search
CPC ... B23H 1/04; B23H 9/10; B23H 7/26; B23H 2600/12; B23H 1/028; F05D 2230/12
See application file for complete search history.

(56) References Cited

U.S. PATENT DOCUMENTS 3,288,699 A    11/1966   Trager et al.
4,441,004 A *   4/1984   Inoue ....................... B23H 1/00
                                                         219/69.15
(Continued)

FOREIGN PATENT DOCUMENTS

CN       1810427 A     8/2006
CN     101332526 A    12/2008
(Continued)

OTHER PUBLICATIONS

Machine translation of Japan Patent document No. 53-030,097, Aug. 2019.*

(Continued)

*Primary Examiner* — Geoffrey S Evans
(74) *Attorney, Agent, or Firm* — Dority & Manning, P.A.

(57) ABSTRACT

An apparatus includes an electrode assembly comprising a carriage having a plurality of electrode holders, the electrode holders being respectively configured to detachably receive a plurality of electrodes, the electrodes include a plurality of first electrodes and a plurality of second electrodes. The first electrodes are configured for rough machining a workpiece by electric discharging or wire electric discharging to remove material from the workpiece, the second electrodes are configured for finish machining the rough machined workpiece by electric discharging to remove material from the rough machined workpiece.

16 Claims, 7 Drawing Sheets

(51) Int. Cl.
 *F01D 5/34* (2006.01)
 *F01D 9/04* (2006.01)
 *B23P 15/00* (2006.01)
(52) U.S. Cl.
 CPC ............ *B23P 15/006* (2013.01); *F01D 9/044* (2013.01); *F05D 2230/12* (2013.01)

(56) References Cited

U.S. PATENT DOCUMENTS

| | | | | |
|---|---|---|---|---|
| 4,739,145 A | * | 4/1988 | Check | B23H 1/00 |
| | | | | 219/69.1 |
| 5,323,536 A | | 6/1994 | Fowler et al. | |
| 5,893,984 A | * | 4/1999 | Thompson | B23H 9/10 |
| | | | | 219/69.15 |
| 6,211,480 B1 | | 4/2001 | Nagata | |
| 7,329,825 B2 | | 2/2008 | Awakura | |
| 7,923,657 B2 | | 4/2011 | Xidacis | |
| 8,162,202 B2 | | 4/2012 | Milburn | |
| 8,210,807 B2 | | 7/2012 | Long | |
| 8,506,257 B2 | | 8/2013 | Bottome et al. | |
| 2006/0169675 A1 | * | 8/2006 | Hwang | B23H 9/10 |
| | | | | 219/69.17 |
| 2009/0001053 A1 | * | 1/2009 | Luo | B23H 1/04 |
| | | | | 219/69.15 |

FOREIGN PATENT DOCUMENTS

| | | | | |
|---|---|---|---|---|
| CN | 103786005 A | | 5/2014 | |
| JP | 53030097 A | * | 3/1978 | ............... B23H 7/26 |
| JP | S53-30097 A | | 3/1978 | |
| JP | 2002-346845 A | | 12/2002 | |
| JP | 2006218565 A | | 8/2006 | |

OTHER PUBLICATIONS

Takahata K et al., "Batch mode micro-EDM for high-density and high-throughput micromachining", Micro Electro Mechanical Systems, 2001. MEMS 2001. The 14th IEEE International Conference on, pp. 72-75, Jan. 21-25, 2001, Meeting Date: Jan. 21-25, 2001, Interlaken, Switzerland.

Machine Translation and First Office Action and Search issued in connection with corresponding CN Application No. 201610191987.9 dated Jun. 25, 2018.

Extended European Search Report and Opinion issued in connection with corresponding EP Application No. 17162473.7 dated Aug. 7, 2017.

\* cited by examiner

US 10,661,368 B2

METHOD AND APPARATUS FOR MACHINING WORKPIECE

BACKGROUND

The field of the disclosure relates generally to methods and apparatuses for machining a workpiece, and more particularly to a method and an apparatus for machining a workpiece by electric discharge machining (EDM).

Electric discharge machining is typically used to cut electrically conductive materials such as steel, graphite, silicon and magnetic materials and widely used in machining metal workpieces. One conventional method of machining the metal workpiece includes rough machining the workpiece by EDM. It is required a long machining time when trying to form a complex mold, such as an outlet guide valve (OGV), which has a large number of airfoils and each with a complex geometrical shape. Because the complex geometrical shape is typically machined by a single electrode rotating on multi-axes that may result in low efficiency and complex motion of the electrode.

Another conventional method of machining the metal workpiece includes rough machining the workpiece by a milling process. However, the milling process is also time-consumed. Therefore, these traditional methods are limited in throughput in a specified time interval.

It is desirable to provide a solution to address at least one of the above mentioned problems.

BRIEF DESCRIPTION

In accordance with one or more embodiments disclosed herein, an apparatus includes an electrode assembly comprising a carriage having a plurality of electrode holders, the electrode holders being respectively configured to detachably receive a plurality of electrodes, the electrodes include a plurality of first electrodes and a plurality of second electrodes. The first electrodes are configured for rough machining a workpiece by electric discharging or wire electric discharging to remove material from the workpiece, the second electrodes are configured for finish machining the rough machined workpiece by electric discharging to remove material from the rough machined workpiece.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Figure 1:
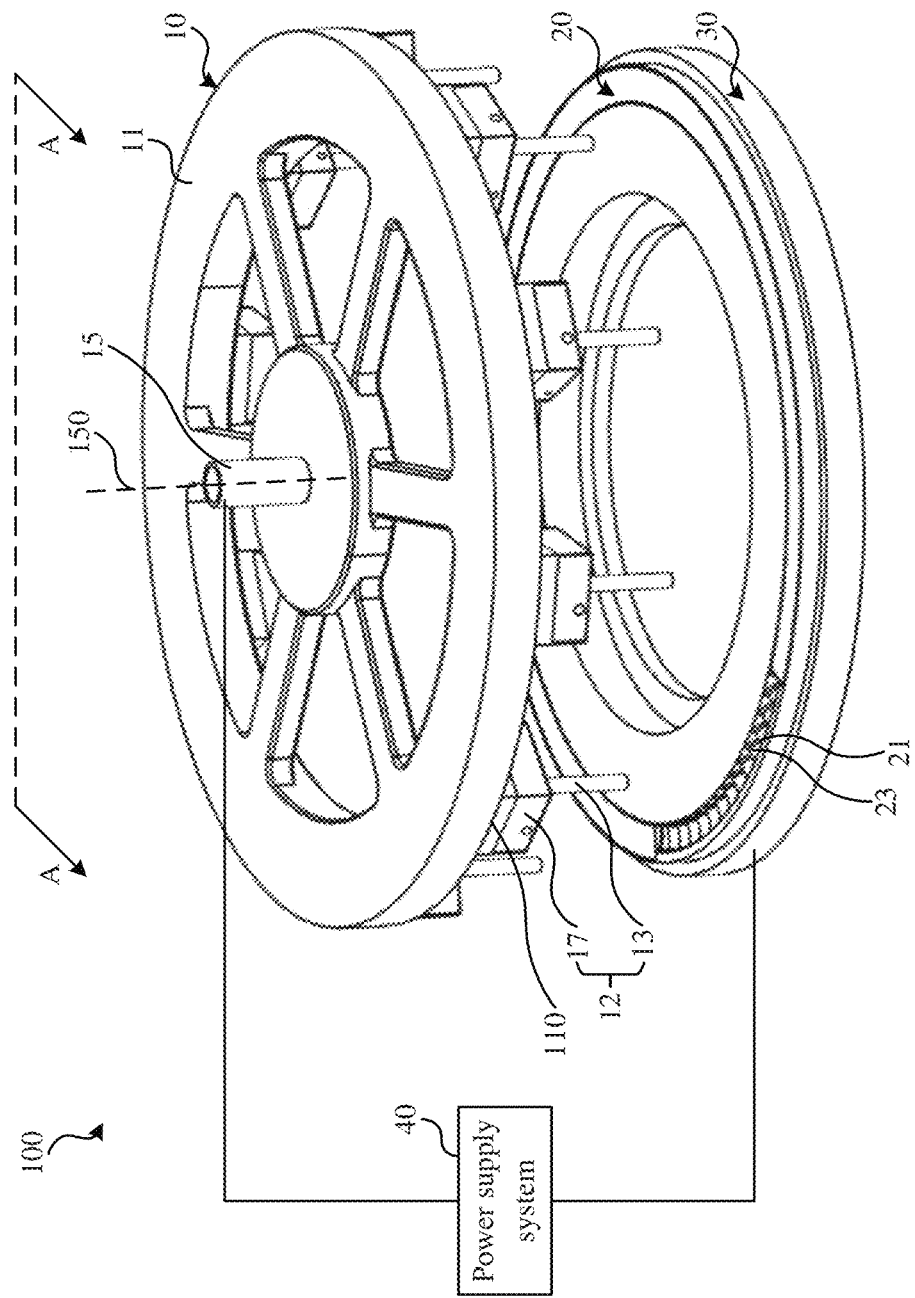
FIG. 1 is a perspective view of an electric discharge machining (EDM) apparatus and a workpiece in accordance with a first exemplary embodiment.

FIG. 1 is a perspective view of an apparatus 100 and a workpiece 20 in accordance with a first exemplary embodiment. The workpiece 20 may be made of any electrically conductive materials that may be machined by electric discharging or wire electric discharging. In the embodiment, the workpiece 20 may be an outlet guide valve (OGV), for example.

Figure 8:
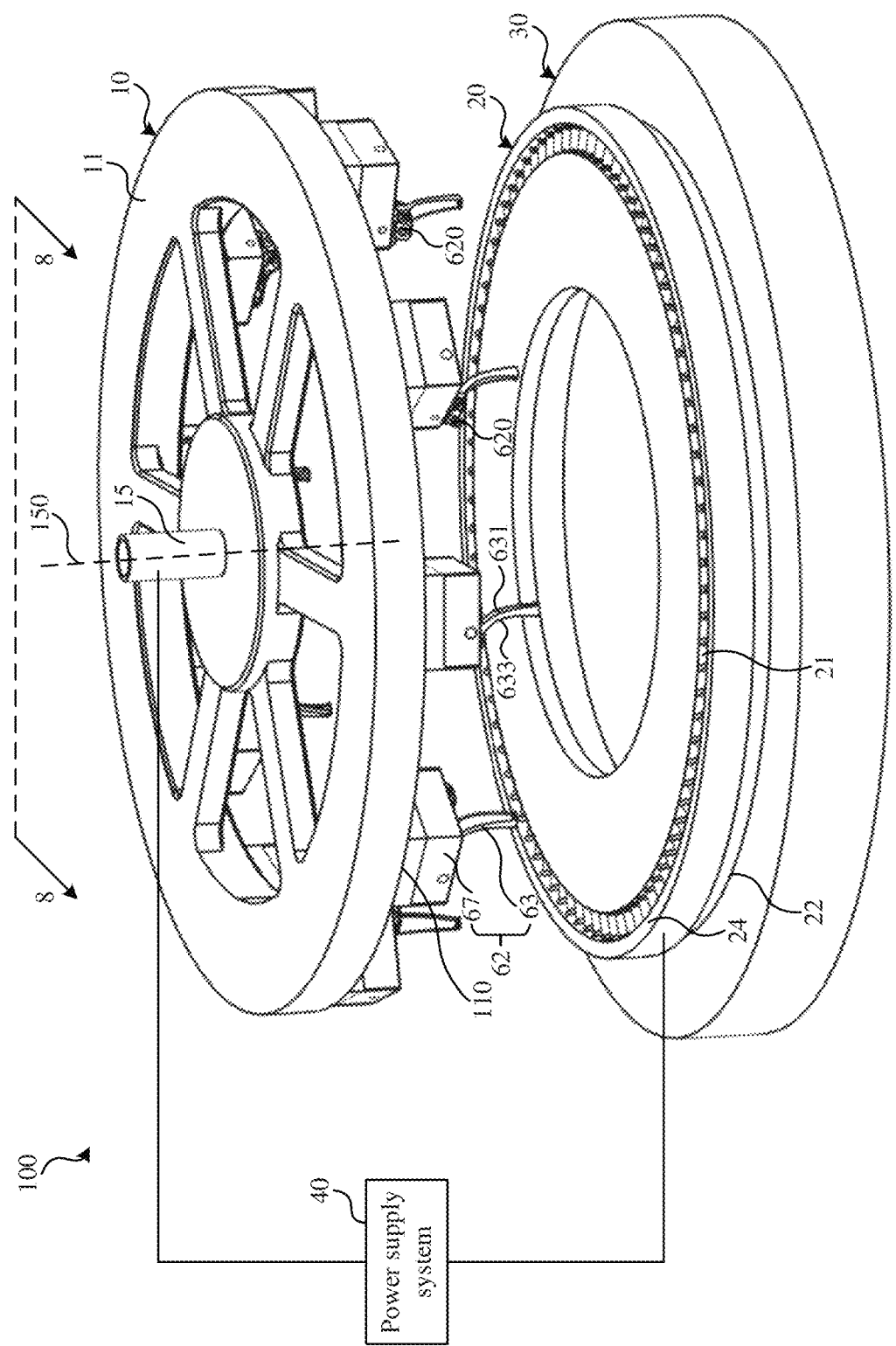
FIG. 8 is a perspective view of the apparatus and the workpiece in accordance with a third exemplary embodiment.

The apparatus 100 includes an electrode assembly 10 and a power supply system 40. The electrode assembly 10 includes a carriage 11 having a plurality of electrode holders 110. A plurality of electrodes of the apparatus 100 including a plurality of first electrodes 12, a plurality of second electrodes 52 which will be described in FIG. 3, and a plurality of third electrodes 62 which will be described in FIG. 8 are configured to be detachably fixed to the respective electrode holder 110 via suitable fixing techniques. As a non-limiting example, the electrode holders 110 define a plurality of receiving space (not shown) to receive the respective electrodes of the apparatus 100, and a plurality of screws (not shown) are employed to fix the respective electrodes of the apparatus 100 into the respective receiving spaces of the electrode holders 110. After the screws are released from the respective electrodes of the apparatus 100, the respective electrodes of the apparatus 100 are released by the electrode holders 110.

The first electrodes 12 are configured for rough machining the workpiece 20 by electric discharging or wire electric discharging to remove material from the workpiece 20.

Correspondingly, the apparatus 100 may be an electric discharge machining (EDM) apparatus or a wire-EDM apparatus, for example. As described herein, during the rough machining process, large quantities of material are removed from the workpiece 20; during a finish machining process that will be described in FIG. 3 and FIG. 8, small quantities of material are removed from the workpiece 20.

During the rough machining process, the first electrodes 12 are installed into the respective electrode holders 110. Each of the first electrodes 12 includes an electrode portion 13 and a fixing portion 17 for detachably fixing the first electrode 12 to an electrode holder 110.

In detail, the first electrodes 12 are configured for rough machining the workpiece 20 to form a plurality of respective cavities 21 in the workpiece 20. A plurality of sections or partitions 23 are each located between two adjacent cavities 21. In the embodiment, the first electrodes 12 may include a plurality of tubular electrodes for example. In other embodiments, the first electrodes 12 may include a plurality of wire electrodes for example.

The electrode assembly 10 further includes a spindle 15 assembled with a carriage 11. In one embodiment, during the rough machining process, the first electrodes 12 are moved along a desired path as the carriage 11 is driven to move along the desired path by a controlling system (not shown), for example a motor, of the apparatus 100 via the spindle 15. The motor may be mechanically linked to the carriage 11 via the spindle 15, for example. In another embodiment, during the rough machining process, the first electrodes 12 are rotated with respect to the workpiece 20 around a common axis as the carriage 11 is driven by the controlling system to rotate around the common axis. In detail, the first electrodes 12 are rotated with respect to the workpiece 20 around the common axis as the carriage 11 is driven to rotate around the common axis by the controlling system via the spindle 15. The common axis is a longitudinal axis of the spindle 15.

The apparatus 100 further includes a supporting device 30. The supporting device 30 is configured to support the workpiece 20. In one embodiment, the supporting device 30 may be a plate for example. In another embodiment, the supporting device 30 may be a roller or other form of support. The workpiece 20 is fastened to the supporting device 30 during machining the workpiece 20 by the first electrodes 12, the second electrodes 52 of FIG. 3 or the third electrodes 62 of FIG. 8, so as to prevent the workpiece 20 from moving and rotating relative to the supporting device 30.

Figure 3:
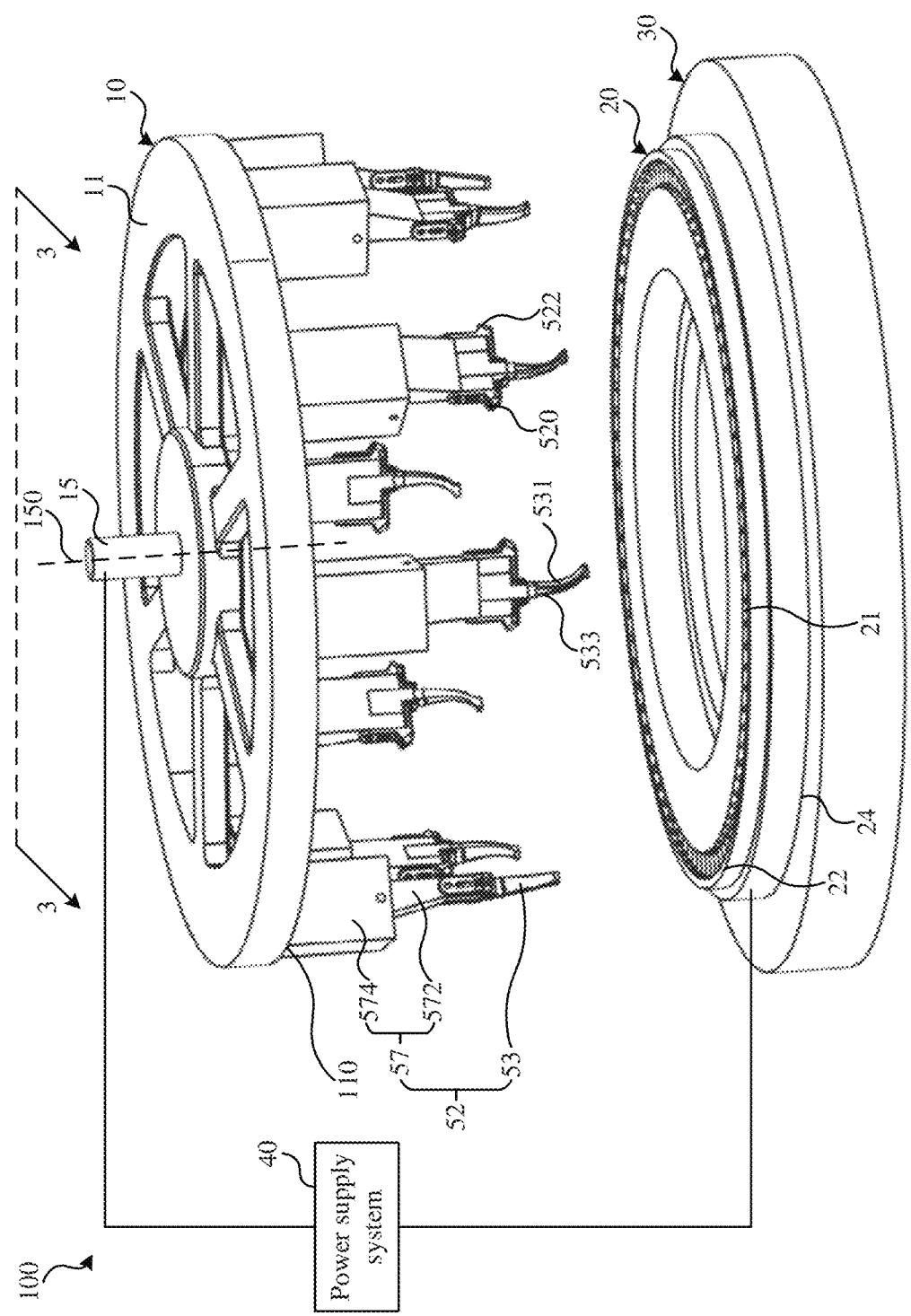
FIG. 3 is a perspective view of the apparatus and the workpiece in accordance with a second exemplary embodiment.

The spindle 15 is mechanically coupled to the carriage 11 that supports the first electrodes 10 during rough machining or supports the second electrodes 52 of FIG. 3 during finish machining or supports the third electrodes 62 of FIG. 8 during finish machining. In the embodiment, the carriage 11 is a substantially round plate. In other embodiments, the carriage 11 is configured as an optimal shape in order to efficiently machine the workpiece 20.

In the embodiment, the spindle 15 is assembled on the center of the carriage 11. In other embodiments, the spindle 15 and the carriage 11 may be integrally formed.

In the embodiment, the first electrodes 12, the second electrodes 52 of FIG. 3 or the third electrodes 62 of FIG. 8 are arranged symmetrically with a longitudinal axis 150 of the spindle 15 so that the electrode assembly 10 is balanced; the first electrodes 12, the second electrodes 52 of FIG. 3 or the third electrodes 62 of FIG. 8 are positioned proximate and substantially opposing the workpiece 20 to facilitate machining the workpiece 20.

Figure 2:
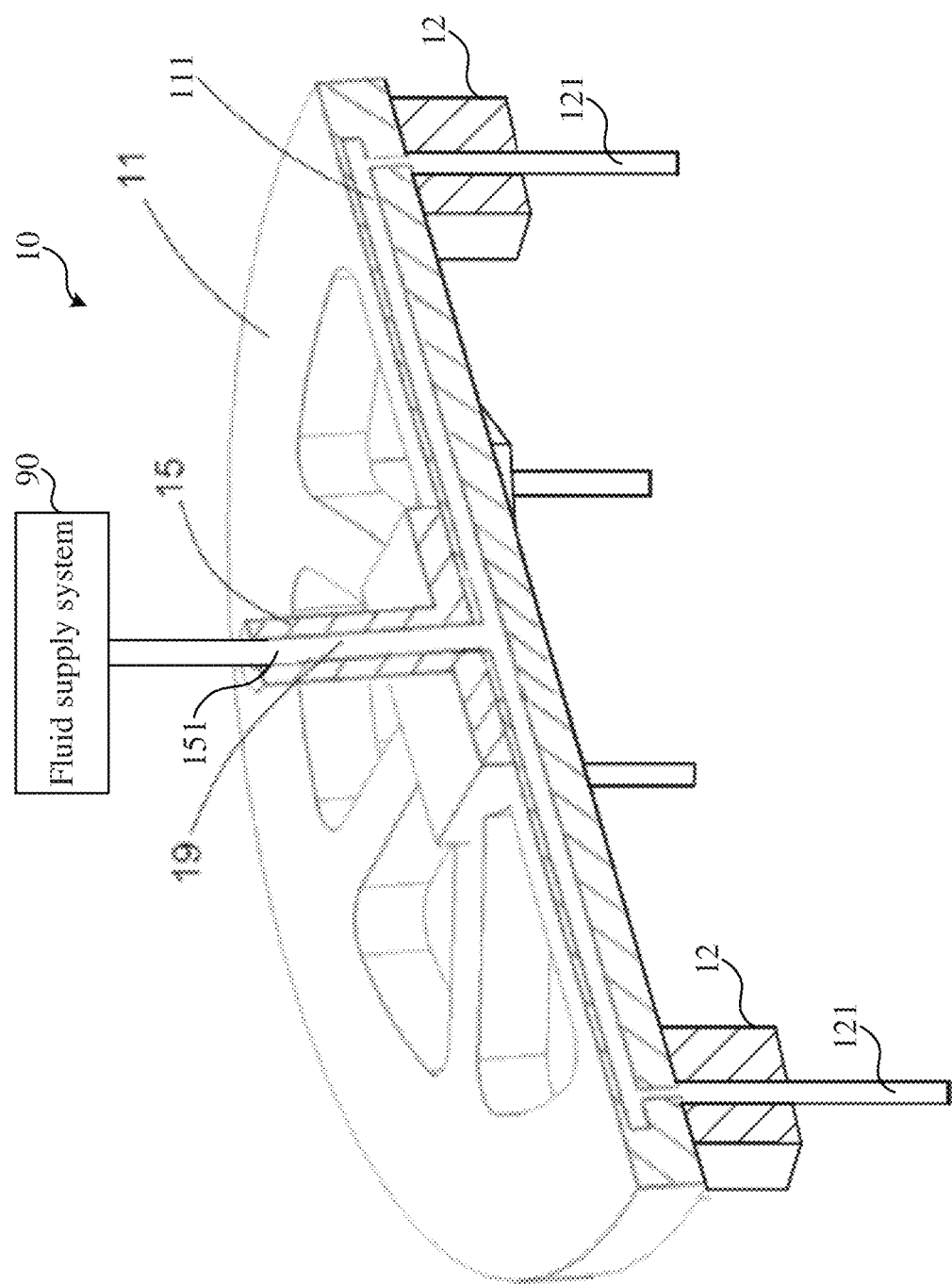
FIG. 2 is a sectional view of the electrode assembly of the apparatus taken along line 1-1 of FIG. 1.

During the rough machining operation, the power supply system 40 is electrically coupled to each of the first electrodes 12 and the workpiece 20 and applies a voltage between each of the first electrodes 12 and the workpiece 20, and a machining fluid from a fluid supply system 90, as shown in FIG. 2, is circulated between each of the first electrodes 12 and the workpiece 20, through which the electric discharge passes therebetween. The power supply system 40 may be integrated in the controlling system (not shown).

FIG. 2 is a sectional view of the electrode assembly 10 of the apparatus 100 taken along line 1-1 of FIG. 1. As shown in FIG. 2, the apparatus 100 further includes the fluid supply system 90. During the rough machining process, the fluid supply system 90 provides the machining fluid to be flowed from each of the first electrodes 12 to the workpiece 20. The fluid supply system 90 may include a pump, a source of the machining fluid, such as a storage tank, or the like for inducing a flow of the machining fluid.

In the embodiment, the machining fluid includes a dielectric fluid. The dielectric fluid may be dielectric oil, e.g. kerosene based dielectric oil.

In the embodiment, the electrode assembly 10 defines a flow channel 19 in fluid communication with the fluid supply system 90. The first electrodes 12 define a plurality of respective electrode channels 121 in fluid communication with the flow channel 19. The machining fluid provided by the fluid supply system 90 is flowed from the flow channel 19 to the workpiece 20 through the electrode channels 121.

In detail, the spindle 15 defines an input channel 151, the carriage 11 defines a transition channel 111. The flow channel 19 include the input channel 151 and the transition channel 111 in fluid communication with the input channel 151. The input channel 151 is fluidly coupled to the fluid supply system 90, the transition channel 111 is fluidly coupled to the electrode channel 121 of each first electrode 12.

FIG. 3 is a perspective view of the apparatus 100 and the workpiece 20 in accordance with a second exemplary embodiment. The electrodes of the apparatus 100 further include the plurality of second electrodes 52.

The second electrodes 52 are configured for finish machining the rough machined workpiece to remove material from the rough machined workpiece by electric discharging. During the finish machining process, the second electrodes 52 are installed to the respective electrode holders 110, and the first electrodes 12 of FIG. 1 are uninstalled from the respective electrode holders 110.

Each of the second electrodes 52 comprises an electrode portion 53 and a fixing portion 57 for detachably fixing the second electrode 52 to an electrode holder 110.

The fixing portion 57 comprises a first sub-fixing portion 572 mechanically coupling the electrode portion 53 and a second sub-fixing portion 574 mechanically coupling the corresponding electrode holder 110. A dimension of the second sub-fixing portion 574 is greater than a dimension of the first sub-fixing portion 572.

In the embodiments, the second electrodes 52 are rotated with respect to the workpiece 20 around a common axis as the carriage 11 is driven by a controlling system (not shown), for example a motor, to rotate around the common axis during the finish machining process. In detail, the second electrodes 52 are rotated around the common axis as the carriage 11 is driven by the controlling system to rotate around the common axis via the spindle 15, the common axis is the longitudinal axis 150 of the spindle 15.

In other embodiments, the supporting device 30 on which the workpiece 20 is situated is rotated around the common axis to facilitate machining the workpiece 20 by the second electrodes 52.

In the embodiment, the second electrodes 52 each have a three-dimensional configuration so as to form complex profiles of the workpiece 20, and the second electrodes 52 are substantially the same. In other embodiments, one or more of the second electrodes 52 have the three-dimensional configuration, and may be different from each other.

In the illustrated embodiment, each of the second electrodes 52 includes a first machining face 531 and a second machining face 533 opposite to the first machining face 531. The first machining face 531 and the second machining face 533 are configured to respectively machine the workpiece 20 according to contours and desired specification. The first machining face 531 in this example is a concave surface for forming a convex face (not shown) in the workpiece 20 corresponding in shape to the first machining face 531, and the second machining face 533 is a convex surface for forming a concave face (not shown) in the workpiece 20 corresponding in shape to the second machining face 533.

In one example, the workpiece 20 may be finish machined by the first machining face 531 and the second machining face 533 successively. In another example, the workpiece 20 may be finish machined by the first machining face 531 or the second machining face 533.

In the embodiment of FIG. 3, a top side 22 of the workpiece 20 faces the second electrodes 52, a bottom side 24 touches the supporting device 30. The second electrodes 52 may be moved into the respective cavities 21 from the top side 22 of the workpiece 20, and remove material from within one half of the respective cavities 21 by electric discharging.

In the embodiment, the second electrodes 52 may be rotated counterclockwise around the longitudinal axis 150 of the spindle 15 in the respective cavities 21 to perform finish machining by the respective first machining faces 531, and rotated clockwise around the longitudinal axis 150 of the spindle 15 in the respective cavities 21 to perform finish machining by the respective second machining faces 533. In other embodiments, the second electrodes 52 may be rotated clockwise around the longitudinal axis 150 of the spindle 15 in the respective cavities 21 to perform finish machining by the respective first machining faces 531, and rotated counterclockwise around the longitudinal axis 150 of the spindle 15 in the respective cavities 21 to perform finish machining by the respective second machining faces 533.

In the embodiments illustrated in FIG. 3, the number of the second electrodes 52 is less than the number of portions, e.g., the cavities 21, of the workpiece 20, which are required to be machined. Some of the cavities 21 are machined at one time and then the second electrodes 52 are rotated around the longitudinal axis 150 of the spindle 15 to machine others of remaining cavities 21 subsequently so that all of the cavities 21 are machined in several iterations. According to one embodiment, the number of the cavities of the workpiece 20 is an integral multiple of the number of the second electrodes 52. In some embodiments, the number of the second electrodes 52 is equal to the number of the cavities 21, so that all the cavities 21 can be machined by the second electrodes 52 at one time.

Figure 4:
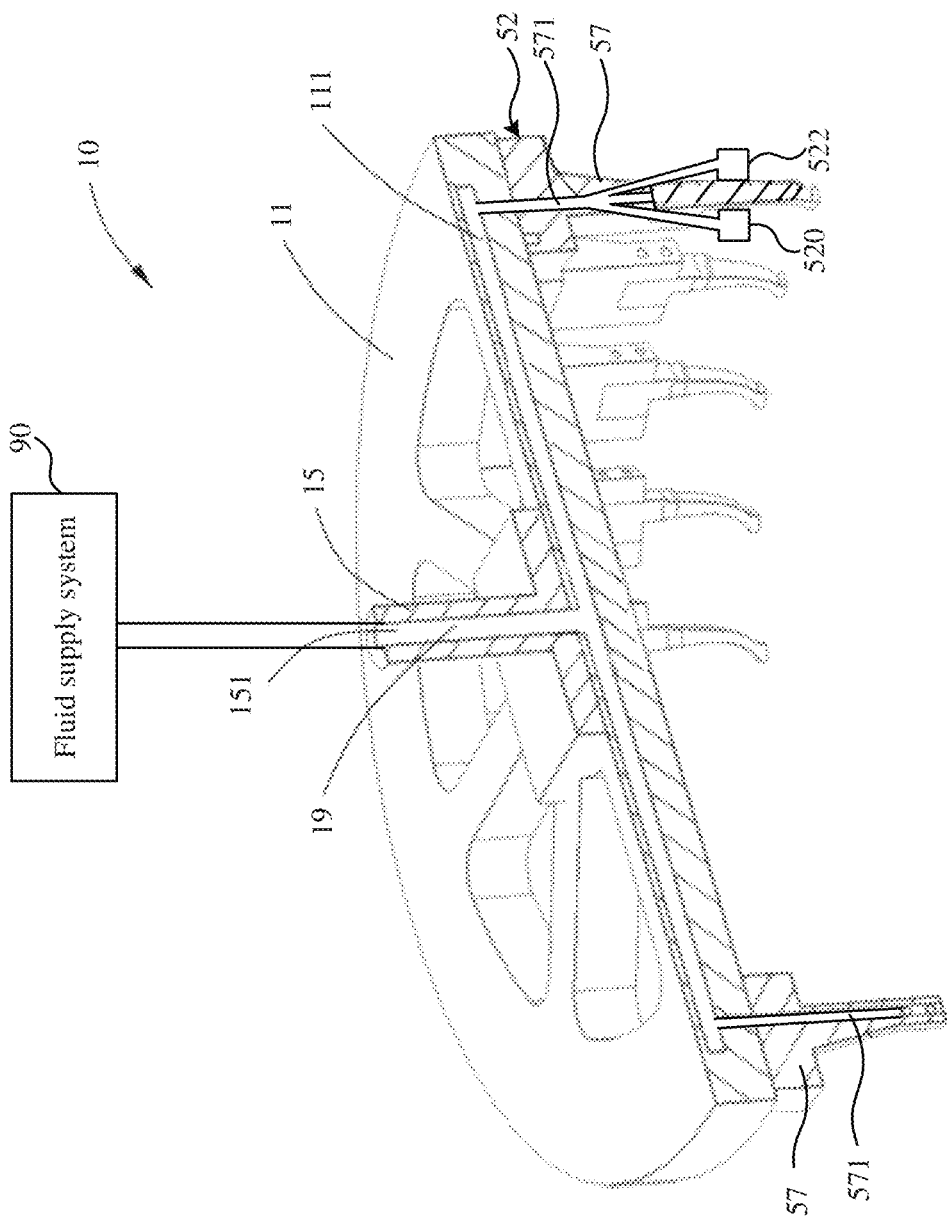
FIG. 4 is a sectional view of the electrode assembly of the apparatus taken along line 3-3 of FIG. 3.

During the finish machining operation, the power supply system 40 is electrically coupled to each of the second electrodes 52 and the workpiece 20 and applies a voltage between each of the second electrodes 52 and the workpiece 20, and the machining fluid from the fluid supply system 90, as shown in FIG. 4, is circulated between each of the second electrodes 52 and the workpiece 20, through which the electric discharge passes therebetween.

FIG. 4 is a sectional view of the electrode assembly 10 of the apparatus 100 taken along line 3-3 of FIG. 3. During the finish machining process, the fluid supply system 90 provides the machining fluid to be flowed from each of the second electrodes 52 to the workpiece 20. In the embodiment, the apparatus 100 further comprises two nozzles 520, 522 mounted to each of the second electrodes 52. Two nozzles 520, 522 of each second electrode 520 are in fluid communication with the flow channel 19 defined in the electrode assembly 10. Therefore, the machining fluid provided by the fluid supply system 90 is flowed from the flow channel 19 to the workpiece 20 through the nozzles 520, 522 of each second electrode 52. The flow channel 19 includes the input channel 151 fluidly coupled to the fluid supply system 90 and the transition channel 111 fluidly coupled to the nozzles 520, 522 of each second electrode 52.

In other embodiments, the apparatus 100 further comprises one nozzle or more than two nozzles mounted to each second electrode 52.

After the rough machined workpiece is finish machined by the second electrodes 52, the workpiece 20 is flushed by the machining fluid through the flow channel 19 and the nozzles 520, 522 to flush debris or residual material removed from the workpiece 20.

In detail, an output channel 571 is defined in the fixing portion 57 of each second electrode 52 and is fluidly coupled to the transition channel 111 and the nozzles 520, 522. The nozzles 520, 522 of each second electrode 52 are in fluid communication with the flow channel 19 through the output channel 571.

Figure 5:
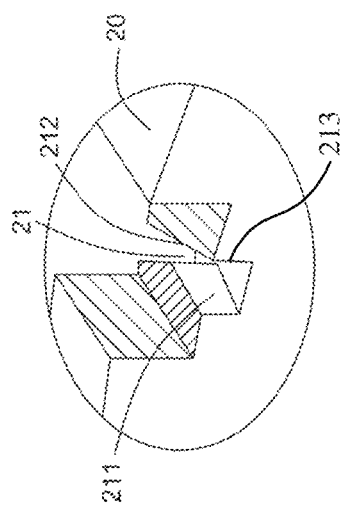
FIG. 5 is a partially cutaway view of a segment of the workpiece of FIG. 3.
Figure 6:
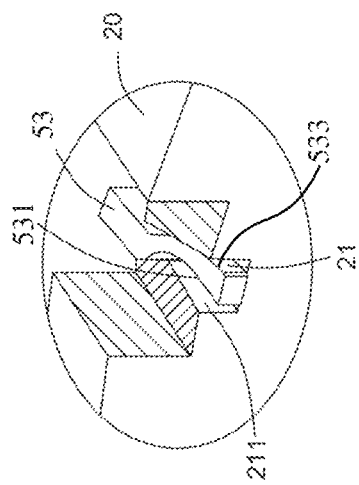
FIG. 6 is a partially cutaway view of the segment of the workpiece of FIG. 5 while an electrode is inserted.
Figure 7:
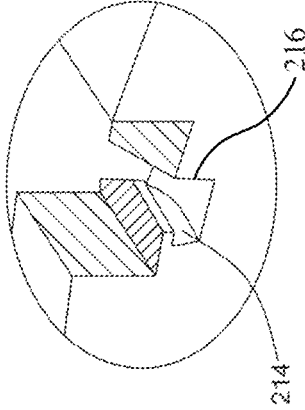
FIG. 7 is a partially cutaway view of the segment of the workpiece of FIG. 5 after the finish machining process.

FIG. 5 illustrates a partially cutaway view of a segment of the workpiece 20 of FIG. 3. The cavity 21 includes a first wall 211 and a second wall 213 opposite to the first wall 211. FIG. 6 illustrates a partially cutaway view of the segment of the workpiece 20 of FIG. 5 while the second electrode 52 is inserted. The first machining face 531 of the second electrode 52 is adjacent to the first wall 211 of the cavity 21, the second machining face 533 of the second electrode 52 is adjacent to the second wall 213 of the cavity 21. FIG. 7 illustrates a partially cutaway view of the segment of the workpiece 20 of FIG. 5, after finish machining by the first machining face 131 and the second machining face 533 of the second electrode 52. Referring to FIGS. 7 and 8, the electrode 13 is moved to the first wall 211 and the second wall 213 the cavity 21 until the desired depth of material removal is attained in the workpiece 20 while the electric discharge is generated and the machining fluid is applied between the electrode 13 and the workpiece 20 so that a finish machined wall 214 and a finish machined wall 216 of the cavity 21 are formed, respectively. In the embodiment, the first machining face 531 is a concave face, such that the finish machined wall 214 is a convex face. The second machining face 533 is a convex face, such that the finish machined wall 216 is a concave face.

FIG. 8 is a perspective view of the apparatus 100 and the workpiece 20 in accordance with a third exemplary embodiment. The electrodes of the apparatus 100 further include the plurality of third electrodes 62. The first electrode 12 of FIG. 1, the second electrode 52 of FIG. 3, and the third electrode 62 are different from each other.

As compared to the second electrodes 52 of FIG. 3, the third electrodes 62 are configured for finish machining the rough machined workpiece to remove more material from the rough machined workpiece by electric discharging.

During the finish machining process, the third electrodes 62 are installed to the respective electrode holders 110, and the second electrodes 52 of FIG. 3 are uninstalled from the respective electrode holders 110.

Each of the third electrodes 62 includes an electrode portion 63 and a fixing portion 67 for detachably fixing the third electrode 62 to an electrode holder 110.

The third electrodes 62 are rotated with respect to the workpiece 20 around the common axis as the carriage 11 is driven to rotate around the common axis during the finish machining process. In detail, the third electrodes 62 are rotated around the common axis as the carriage 11 is driven to rotate around the common axis via the spindle 15, the common axis is the longitudinal axis 150 of the spindle 15.

In the embodiment of FIG. 8, compared to FIG. 3, the workpiece 20 may be turned over by 180 degree, so that the bottom side 24 of the workpiece 20 faces the third electrodes 62, the top side 22 touches the supporting device 30. The third electrodes 62 may be moved into the respective cavities 21 from the bottom side 24 of the workpiece 20, and remove material from within another half of the respective cavities 21 by electric discharging.

Similar to the second electrodes 52 of FIG. 3, each of the third electrodes 62 includes a first machining face 631 and a second machining face 633 opposite to the first machining face 631. In the embodiment, the first machining face 631 may be a convex surface for example, the second machining face 633 may be a concave surface for example.

In one embodiment, the third electrodes 62 may be rotated counterclockwise around the longitudinal axis 150 of the spindle 15 in the respective cavities 21 to perform finish machining by the respective first machining faces 631, and rotated clockwise around the longitudinal axis 150 of the spindle 15 in the respective cavities 21 to perform finish machining by the respective second machining faces 633. Therefore, the internal surfaces of another half of the corresponding cavity 21 are machined by the first machining face 631 of each third electrode 62 to form a concave surface, the internal surfaces of another half of the corresponding cavity 21 are machined by the second machining face 633 of each third electrode 62 to form a convex surface.

Figure 9:
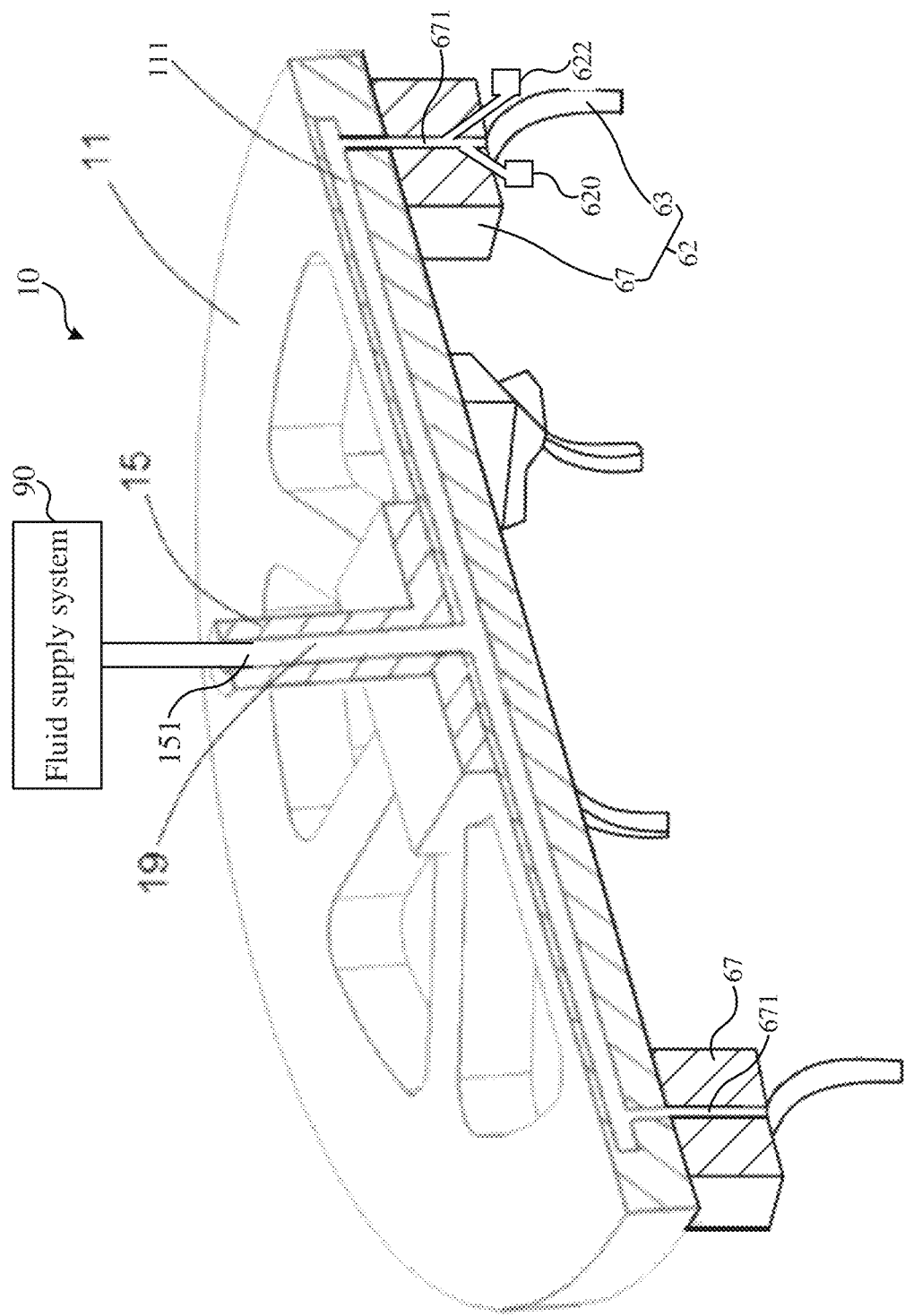
FIG. 9 is a sectional view of the electrode assembly of the apparatus taken along line 8-8 of FIG. 8.

During the finish machining operation, the power supply system 40 is electrically coupled to each of the third electrodes 62 and the workpiece 20 and applies a voltage between each of the third electrodes 62 and the workpiece 20, and the machining fluid from the fluid supply system 90, as shown in FIG. 9, is circulated between each of the third electrodes 62 and the workpiece 20, through which the electric discharge passes therebetween.

FIG. 9 is a sectional view of the electrode assembly 10 of the apparatus 100 taken along line 8-8 of FIG. 8. During the finish machining process, the fluid supply system 90 provides the machining fluid to be flowed from each of the third electrodes 62 to the workpiece 20. In the embodiment, the apparatus 100 further comprises two nozzles 620, 622 mounted to each of the third electrodes 62. Two nozzles 620, 622 of each third electrode 62 are in fluid communication with the flow channel 19 defined in the electrode assembly 10. Therefore, the machining fluid provided by the fluid supply system 90 is flowed from the flow channel 19 to the workpiece 20 through the nozzles 620, 622 of each third electrode 62. In detail, the flow channel 19 includes the input channel 151 fluidly coupled to the fluid supply system 90 and the transition channel 111 fluidly coupled to the nozzles 620, 622 of each third electrode 62.

In other embodiments, the apparatus 100 further comprises one nozzle or more than two nozzles mounted to each third electrode 62.

After the rough machined workpiece is finish machined by the third electrodes 62, the workpiece 20 is flushed by the machining fluid through the flow channel 19 and the nozzles 620, 622 to flush debris or residual material removed from the workpiece 20.

In detail, an output channel 671 is defined in the fixing portion 67 of each third electrode 62 and is fluidly coupled to the transition channel 111 and the nozzles 620, 622. The nozzles 620, 622 of each third electrode 62 are in fluid communication with the flow channel 19 through the output channel 671.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure will not be limited to the particular embodiment disclosed as the best mode contemplated for carrying out this disclosure, but that the disclosure will include all embodiments falling within the scope of the appended claims.

The invention claimed is:

1. An apparatus, comprising:
an electrode assembly comprising a carriage having a plurality of electrode holders, the electrode holders being respectively configured to detachably receive a plurality of electrodes, the electrodes comprising a plurality of first electrodes, a plurality of second electrodes, and a plurality of third electrodes;
wherein the first electrodes are configured for rough machining to form a plurality of respective cavities in a workpiece by electric discharging or wire electric discharging to remove material from the workpiece,
wherein the second electrodes are configured to be received in the respective cavities formed by the respective first electrodes and for finish machining the rough machined workpiece by electric discharging to remove material from the rough machined workpiece, wherein the second electrodes are configured remove material from within one half of the respective cavities,
wherein the third electrodes are configured for finish machining the rough machined workpiece by electric discharging to remove more material from the rough machined workpiece, and wherein the third electrodes are configured to be received in the respective cavities formed by the respective first electrodes and remove material from within another half of the respective cavities.

2. The apparatus of claim 1, wherein the electrodes are configured to be rotated with respect to the workpiece around a common axis as the carriage is driven to rotate around the common axis.

3. The apparatus of claim 2, wherein the electrode assembly further comprises a spindle assembled with the carriage, the electrodes are configured to be rotated around the common axis as the carriage is driven to rotate around the common axis via the spindle; the common axis is a longitudinal axis of the spindle.

4. The apparatus of claim 1, wherein each of the electrodes comprises an electrode portion and a fixing portion for detachably fixing the electrode to an electrode holder of the carriage.

5. The apparatus of claim 1, wherein each of the first electrodes comprise a tubular electrode or a wire electrode.

6. The apparatus of claim 1, wherein the electrode assembly defines a flow channel in fluid communication with a fluid supply system, each of the first electrodes defines an electrode channel in fluid communication with the fluid supply system through the flow channel.

7. The apparatus of claim 1, wherein the electrode assembly defines a flow channel in fluid communication with a fluid supply system, the apparatus further comprises:
at least one nozzle in fluid communication with the fluid supply system through the flow channel and mounted to each of the second electrodes or each of the third electrodes.

8. The apparatus of claim 1, further comprising:
a fluid supply system for circulating a machining fluid between each of the electrodes and the workpiece; and
a power supply system for applying a voltage between each of the electrodes and the workpiece.

9. A method for machining a workpiece by an electrode assembly that comprises a carriage having a plurality of electrode holders, the method comprising:
installing a plurality of first electrodes to the respective electrode holders and rough machining the workpiece with the first electrodes by electric discharging or wire electric discharging to remove material to rough machine the workpiece to form a plurality of respective cavities in the workpiece;
removing the first electrodes from the respective electrode holders and installing a plurality of second electrodes to the respective electrode holders;
receiving the second electrodes in the respective cavities formed by the respective first electrodes and using the second electrodes to remove material from within one half of the respective cavities to finish machining the rough machined workpiece with the second electrodes by electric discharging to remove material from the rough machined workpiece;
removing the second electrodes from the respective electrode holders and installing a plurality of third electrodes to the respective electrode holders; and
receiving the third electrodes in the respective cavities formed by the respective first electrodes and using the third electrodes to remove material from within another half of the respective cavities to finish machining the rough machined workpiece with the third electrodes by electric discharging to remove more material from the rough machined workpiece.

10. The method of claim 9, further comprising:
rotating the electrodes with respect to the workpiece around a common axis as the carriage is driven to rotate around the common axis.

11. The method of claim 10, wherein the electrode assembly further comprises a spindle assembled with the carriage, the method further comprises:
rotating the electrodes around the common axis as the carriage is driven to rotate around the common axis via the spindle; wherein the common axis is a longitudinal axis of the spindle.

12. The method of claim 9, wherein the electrode assembly defines a flow channel, each of the first electrodes defines an electrode channel in fluid communication with the flow channel; wherein the method further comprises:
providing a machining fluid to flow from the flow channel to the workpiece through the electrode channel of each first electrode.

13. The method of claim 9, wherein the electrode assembly defines a flow channel, each of the second electrodes or each of the third electrodes is mounted with at least one nozzle that is in fluid communication with the flow channel; wherein the method further comprises:
providing a machining fluid to flow from the flow channel to the workpiece through the at least one nozzle of each second electrode or each third electrode.

14. The method of claim 9, further comprising:
circulating a machining fluid between the workpiece and each of the electrodes; and
applying a voltage between the workpiece and each of the electrodes.

15. The method of claim 9, wherein each of the first electrodes comprises a tubular electrode or a wire electrode.

16. A method for machining a workpiece by an electrode assembly that comprises a carriage having a plurality of electrode holders, the method comprising:
installing a plurality of first electrodes to the respective electrode holders and rough machining the workpiece with the first electrodes by electric discharging or wire electric discharging to remove material from the workpiece;
removing the first electrodes from the respective electrode holders and installing a plurality of second electrodes to the respective electrode holders;
finish machining the rough machined workpiece with the second electrodes by electric discharging to remove material from the rough machined workpiece;
removing the second electrodes from the respective electrode holders and installing a plurality of third electrodes to the respective electrode holders;
finish machining the rough machined workpiece with the third electrodes by electric discharging to remove more material from the rough machined workpiece; and
turning over the workpiece by 180 degree to facilitate removing more material from the rough machined workpiece by the third electrodes.

* * * * *